Figure 1:
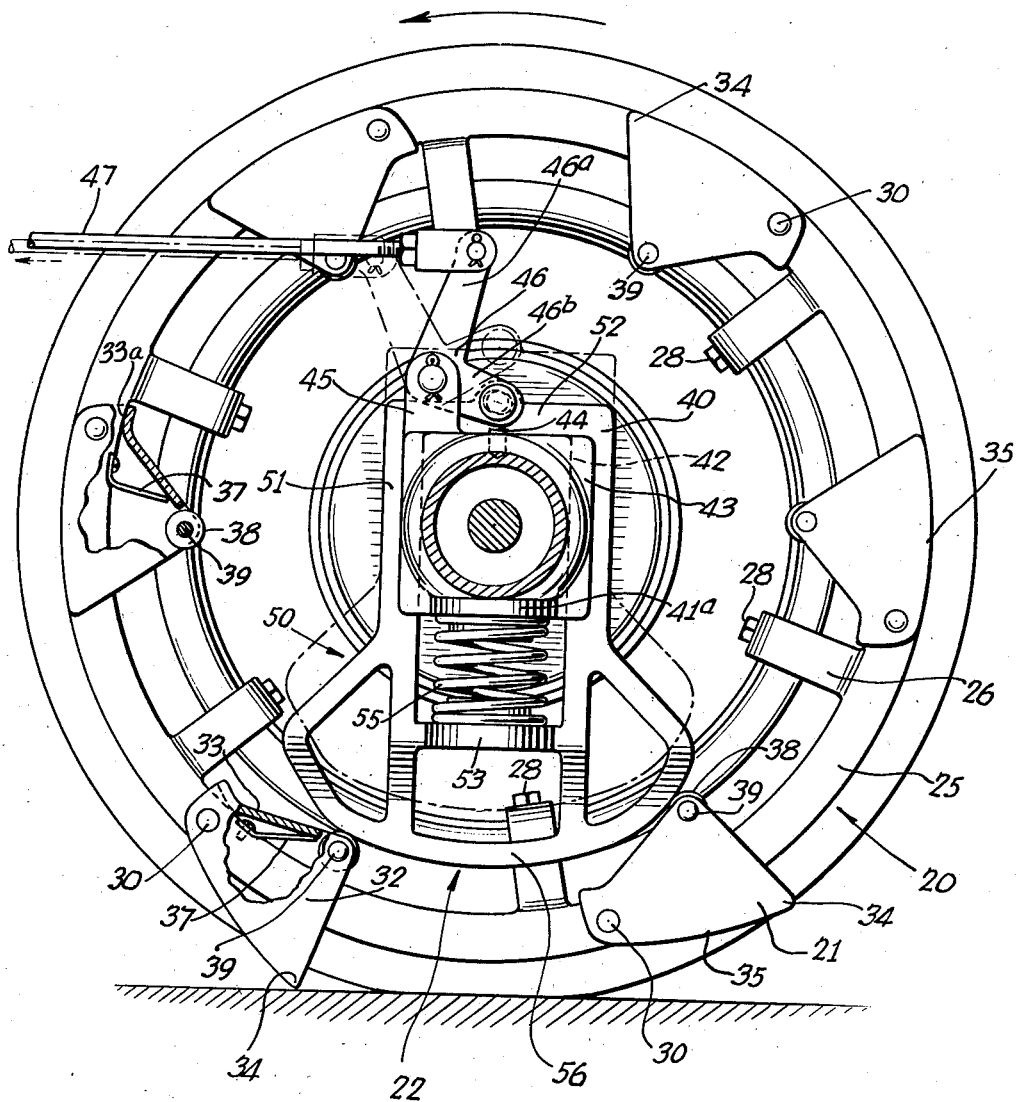

Sept. 28, 1937.  W. COOK  2,094,425
MANUALLY CONTROLLED ANTISKID DEVICE
Filed April 20, 1936  2 Sheets-Sheet 1

INVENTOR
WALTER COOK
BY
Carl Miller
ATTORNEY

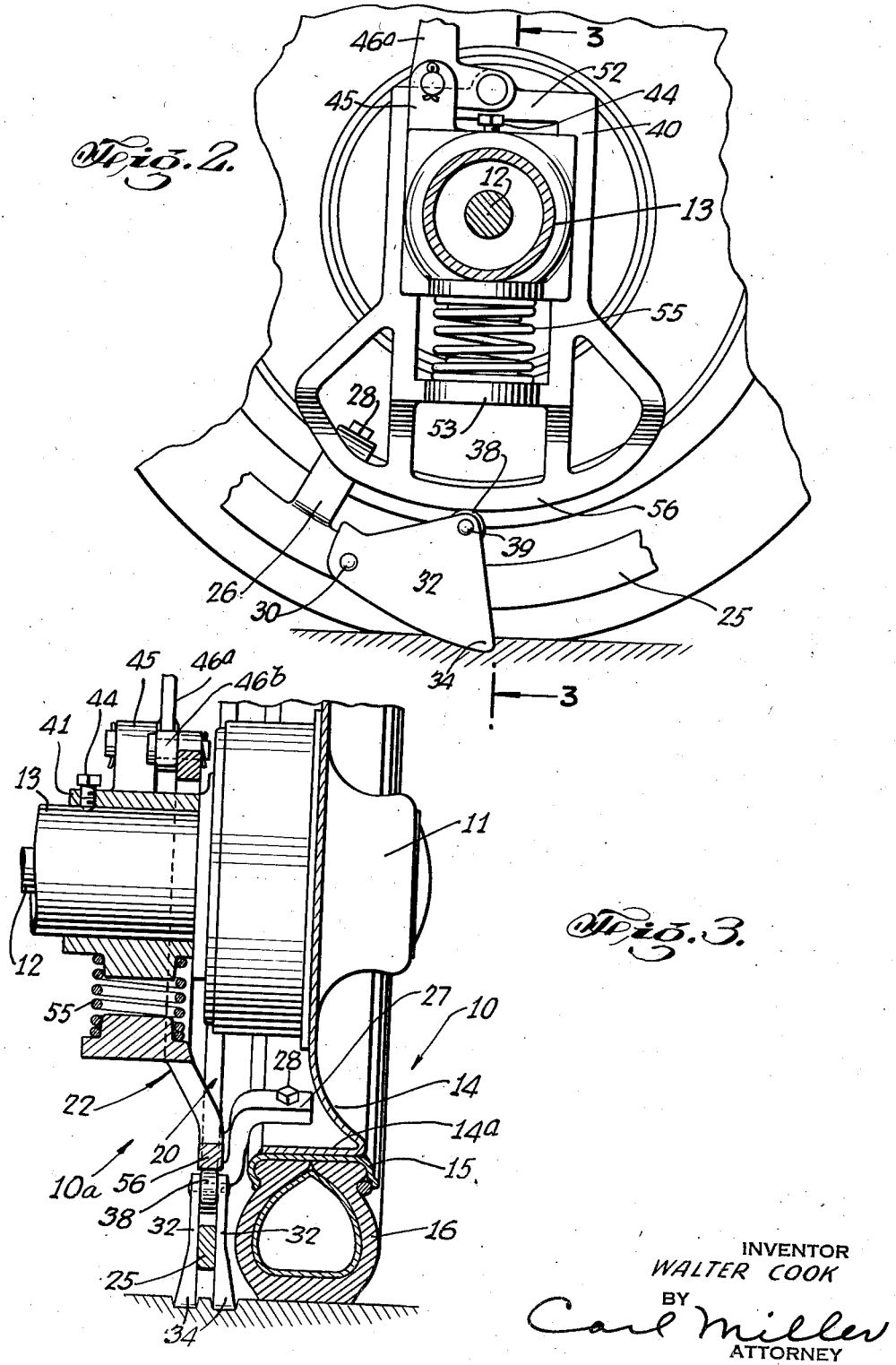

Patented Sept. 28, 1937

2,094,425

UNITED STATES PATENT OFFICE 2,094,425

MANUALLY CONTROLLED ANTISKID DEVICE

Walter Cook, New York, N. Y.

Application April 20, 1936, Serial No. 75,309

6 Claims. (Cl. 301—49)

This invention relates to anti-skid devices for vehicles.

An object of this invention is to provide an anti-skid device of the character described which may be readily mounted on the wheel of an automobile or the like vehicles, and easily actuated by the operator of the vehicle to prevent skidding.

A further object of this invention is to provide a rugged and durable device of the character described which shall be relatively inexpensive to manufacture, positive in action, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a side elevational view of a wheel provided with an anti-skid device embodying the invention, Fig. 2 is a partial view of the structure of Fig. 1, with the wheel and anti-skid device in another position, and Fig. 3 is a cross-sectional view taken on line 3—3 of Fig. 2.

Referring now in detail to the drawings, 10 designates a wheel, here shown for the purpose of illustration only, as the wheel of an automobile, provided with anti-skid mechanism 10a embodying the invention. The wheel 10 comprises a hub 11 and an axle 12 within the axle housing 13. The hub 12 carries a disc 14 provided with an annular flange 14a, supporting a rim 15 on which the tire 16 is mounted.

The anti-skid mechanism 10a comprises generally a frame 20 rotatable with the wheel and carrying ground engaging members 21 adapted to be moved into ground engaging position by a mechanism 22 on the axle housing 13 arranged for movement into or out of operative position in the manner hereinafter explained.

The frame 20 comprises an annulus 25 located on the inside of the tire and of a diameter somewhat less than that of the outer periphery of said tire. Said ring is maintained in position coaxial with respect to the wheel 10 by a plurality of angularly spaced, inwardly projecting radial lugs 26 having parallel portions 27 contacting the inner surface of flange 14a and being screwed thereto by screws 28.

The ground engaging members 21 are similar, and spaced around the ring 25. Each is pivoted to the said ring 25 as by pin 30. Said members 21 have parallel walls 32 of substantially triangular shape, receiving the ring 25 therebetween, and being interconnected by a web or wall 33 disposed within said ring. The pivot pin 30 interconnects the walls 32 at substantially the apices of said walls and passes through the ring 25. Said walls 32 preferably increase in thickness toward the outer corners 34. The outer edges 35 of said walls 32 preferably have the curvature of the outer periphery of the ring 25.

A strip spring 37 between walls 32 of each member 21 is attached at one end to the inner periphery of ring 25 and engages web or wall 33 of said member to normally pivot said member in a counterclockwise direction about pin 30 (looking at Fig. 1 or 2) to maintain said member inwardly of ring 25 when not in engagement with mechanism 22. In such position edges 35 of walls 32 register with the outer priphery of said ring 25. The inner ends 33a of webs 33 are adapted to contact the ring 25 and limit counterclockwise movement of members 21.

When the mechanism 22 is in inoperative position as shown by the dot-dash lines of Fig. 1, the members 21 do not contact the ground and the vehicle may proceed normally.

The webs or walls 33 terminate short of the walls 32 to accommodate a roller 38 in each member 21 between walls 32 thereof and mounted on a transverse pin 39. Said rollers project radially inwardly beyond the web 33 for the purpose hereinafter appearing.

Fixed on the axle housing 13 and receiving the same therethrough is a block 41 having parallel, vertical sides 42 provided with flanges 43. A set screw 44 serves to fix said block 41 to said housing. The block 41 has at the bottom thereof a circular spring seat 41a. Said block also has an upstanding lug 45 to which is pivoted a bell-crank 46 having arms 46a and 46b. Attached to the arm 46a is a connecting or pull rod 47 controlled by the operator in any suitable manner and normally in the dot-dash position of Fig. 1. The operator may, however, push the rod rearwardly to the full line position thereof, as shown in Fig. 1, to rotate the bell-crank 46 in a clockwise direction about its pivot, for the purpose hereinafter explained.

The mechanism 22 comprises a member 50 mounted on block 41 for reciprocation. The member 50 has a yoke portion receiving said block and provided with parallel vertical walls 51 received between the guide flanges 42. Said walls 51 are interconnected at the top by a horizontal wall 52 to which arm 46b of the bell-crank is pivoted. The member 50 also has a spring seat 53 aligned with the spring seat 41a, there being a compression spring 55 between said seats, tending to lower said member. At the bottom thereof said member 50 has a curved or cammed portion 56, normally out of the path of the rollers 39, when the said member is raised as shown in dot-dash lines in Fig. 1.

Thus, during normal travel of the vehicle, the wheel turns together with ring 20, and the members 21 do not contact the ground. Should it be desired to use the anti-skid mechanism, the operator merely moves the rod 47 rearwardly, or releases the same to permit the spring 55 to move the members 50 downwardly and bring cam 56 into the path of rollers 38. As the wheel rotates, the rollers contact the cam and the members 21 at the bottom are rotated in clockwise directions about their pivots to press the points 34 into the ground. As the members 21 pass beyond the cam 56, the springs 37 rotate said members counterclockwise to be contained within the circumference outline of ring 20.

It will thus be seen that there is provided a device in which the several objects of this invention are achieved, and which is well adapted to meet the condition of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus set forth and disclosed the nature of this invention, what is claimed is:

1. In combination with the wheel of a vehicle, a coaxial ring attached thereto, a plurality of members pivoted to said ring, a block on the axle housing of said vehicle, a member slidably mounted on said block and movable into the path of said pivoted members, said pivoted members having parallel walls receiving the ring therebetween, and interconnected by a web disposed on the inside of the ring.

2. In combination with the wheel of a vehicle, a coaxial ring attached thereto, a plurality of members pivoted to said ring, a block on the axle housing of said vehicle, a member slidably mounted on said block and movable into the path of said pivoted members, said pivoted members having parallel walls receiving the ring therebetween, interconnected by a web disposed on the inside of the ring, and a spring between each pivoted member and ring for rotating the same inwardly of said ring.

3. In combination with the wheel of a vehicle, a coaxial ring attached thereto, a plurality of members pivoted to said ring, a block on the axle housing of said vehicle, a member slidably mounted on said block and movable into the path of said pivoted members, said pivoted members having parallel walls receiving the ring therebetween, interconnected by a web disposed on the inside of the ring and a roller on each pivoted member adapted to be contacted by said slidably mounted member.

4. In combination with the wheel of a vehicle, a coaxial ring attached thereto, a plurality of members pivoted to said ring, a block on the axle housing of said vehicle, a member slidably mounted on said block and movable into the path of said pivoted members, said pivoted members having parallel walls receiving the ring therebetween, interconnected by a web disposed on the inside of the ring, a spring between each pivoted member and ring for rotating the same inwardly of said ring and means on said pivoted members for limiting rotation thereof by said springs.

5. In combination with the wheel of an automobile, a ring coaxial with respect to said wheel and having lugs fixed to said wheel, an axle housing, a member receiving the axle housing, fixed to said housing and having parallel sides provided with guide flanges, a member having a yoke portion slidably receiving said first member and provided with parallel walls contacting the sides of said first member, a coil compression spring between said first and second members, a bell-crank pivoted to said first member and having an arm pivoted to said second member, a plurality of spaced similar members pivoted to said ring and having rollers thereon, said second member having a curved portion adapted to move into the path of said rollers and a spring for rotating each of said pivoted members and each pivoted member having parallel walls receiving said ring therethrough and connected by a web disposed on the inside of the ring.

6. In combination with the wheel of an automobile, a ring coaxial with respect to said wheel and having lugs fixed to said wheel, an axle housing, a member receiving the axle housing, fixed to said housing and having parallel sides provided with guide flanges, a member having a yoke portion slidably receiving said first member and provided with parallel walls contacting the sides of said first member, a coil compression spring between said first and second members, a bell-crank pivoted to said first member and having an arm pivoted to said second member, a plurality of spaced similar members pivoted to said ring and having rollers thereon, said second member having a curved portion adapted to move into the path of said rollers and a spring for rotating each of said pivoted members, each pivoted member having parallel walls receiving said ring therethrough and connected by a web disposed on the inside of the ring and the parallel walls of said members having pointed portions of increased thickness over said parallel walls.

WALTER COOK.